Nov. 3, 1970    L. O. SCHORSCH    3,537,313
LIQUID LEVEL GAUGE
Filed April 8, 1969
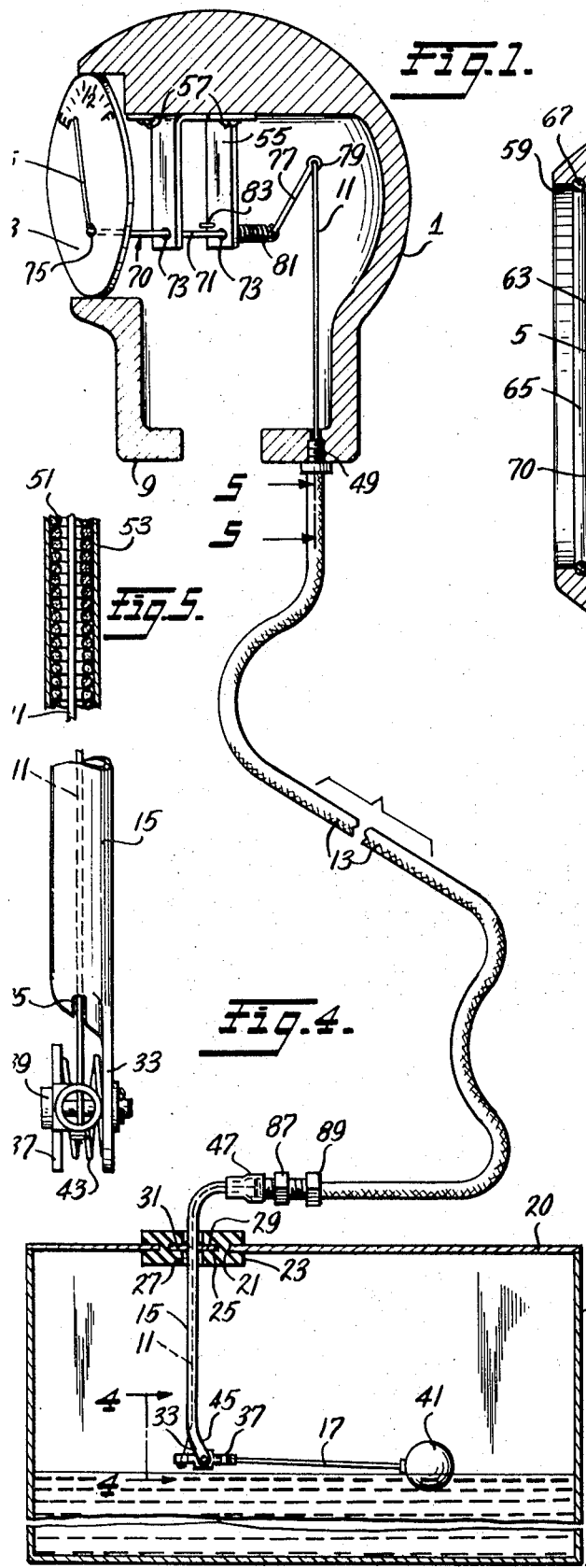
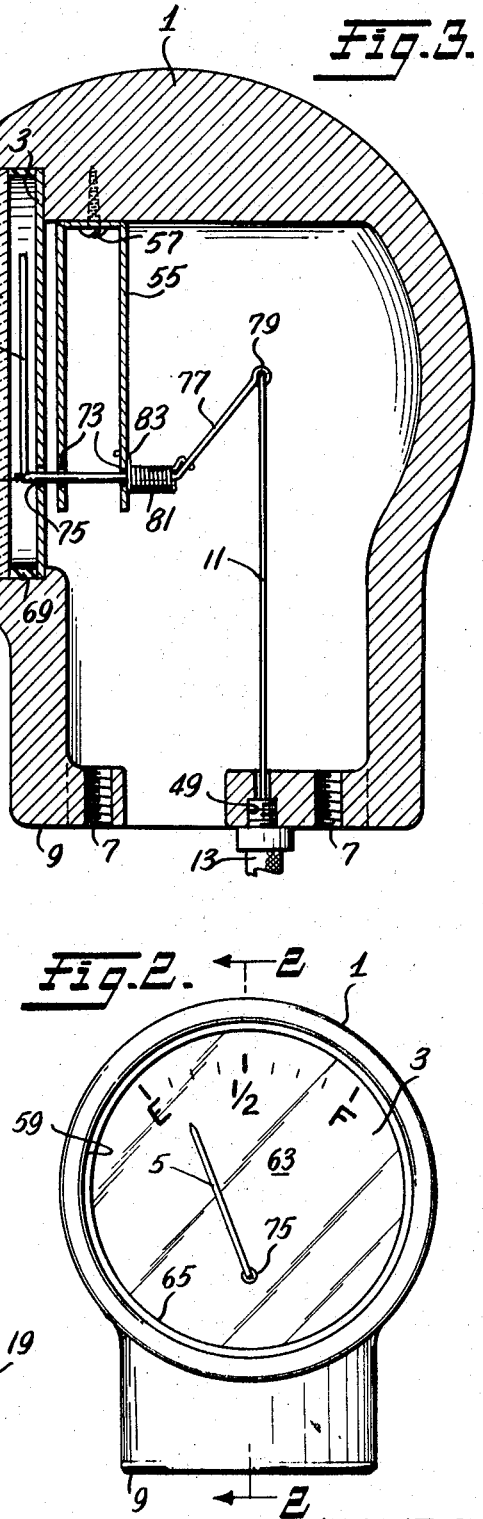
INVENTOR
LOUIS O. SCHORSCH
BY Bacon & Thomas
ATTORNEYS

United States Patent Office 3,537,313
Patented Nov. 3, 1970

3,537,313
LIQUID LEVEL GAUGE
Louis O. Schorsch, Monterey Park, Calif. (% Velarde & Takasugi, 5410 E. Beverly Blvd., Los Angeles, Calif. 90022)
Filed Apr. 8, 1969, Ser. No. 814,277
Int. Cl. G01f 23/08
U.S. Cl. 73—318                                6 Claims

ABSTRACT OF THE DISCLOSURE

Liquid level in a tank is shown by a pointer connected with a float by way of a flexible wire slidable within a housing of adjustable length. The tube, to which the float arm is pivoted, is supported and sealed in an opening in the tank wall by a heavy rubber grommet. A coil spring acting on the float arm serves to dampen its oscillations due to liquid sloshing around in the tank while another coil spring urges the pointer toward the empty position.

---

This invention relates to improvements in gauges for indicating the level of liquid in a tank or other receptacle at a point remote from the tank.

In summary, it is an object of this invention to provide an improved arrangement for resiliently supporting and securing the float portion of the device in a tank.

Another object of the invention is to provide an arrangement whereby the oscillations imparted to the float by liquid sloshing around in a tank are dampened so as to reduce fluctuating movement of the pointer which indicates the liquid level in the tank.

A further object is to provide a novel and simplified one-piece pointer resiliently biased toward the position to indicate an empty tank.

These and other objects of the invention will become more apparent from the following specification and claims taken in conjunction with the drawings in which:

FIG. 1 is a diagrammatic view of the invention;
FIG. 2 is an elevational view of the face of the indicator casing;
FIG. 3 is an enlarged cross-sectional view of the indicator casing taken on line 3—3 of FIG. 2;
FIG. 4 is an enlarged fragmentary end elevational view taken on line 4—4 of FIG. 1 showing the arrangement of the pivotal connection between the float arm and the support tube; and
FIG. 5 is an enlarged, fragmentary, cross-sectional view taken on line 5—5 of FIG. 1 showing a portion of the flexible cable and its housing.

As illustrated in the drawings, the liquid level gauge includes a casing 1, which houses a fixed dial 3 and movable pointer 5, and is adapted to be mounted on a suitable support by appropriate fasteners connected to the threaded openings 7 provided in the base 9 of the casing.

A flexible cable or wire 11 is connected in the casing 1 with the pointer 5 and extends through a flexible housing 13 and support tube 15 to one end of a pivoted float arm 17 shown mounted in a tank 19.

The tank 19 is representative of a receptacle to which the present liquid level gauge is adapted to be attached and may include the conventional filling and drain openings, not shown. The tank 19, formed of metal or other suitable rigid material, is provided in the top wall 20 thereof with a circular opening 21 into which a grommet 23, formed of rubber or other suitable resilient material is inserted. The large, thick grommet 23 is formed with an annual recess 25 extending radially inwardly from the periphery thereof. The portion of the top wall 20 immediately surrounding the opening 21 is received within the annual recess 25 with a tight, sealing, resilient fit. The grommet is also formed with a central passage 27 and an inner annual recess 29 which extends radially outwardly from the central passage 27.

The support tube 15 extends freely through the central passage 27 and a washer 31, welded or otherwise fixedly secured to the support tube 15 adjacent to the upper end thereof, is inserted into the inner annular recess 29 with a tight, sealing, resilient fit. By means of this arrangement, it will be seen that the support tube 15 is resiliently supported by the top wall 20 of the tank by the grommet 23 and, in addition, a liquid seal is provided by the grommet 23 around the circular opening 21 as well around the support tube 15 and its washer 31. Although the opening 21 has been described as circular, it is obvious that openings of other configurations may be employed with grommets having a corresponding configuration.

The lower end of the support tube 15 is preferably flattened as shown at 33 and provided with an opening 35 for the free passage therethrough of the flexible cable 11. A short lever or bell crank 37 is pivotly mounted on a pivot pin 39 supported in suitable aligned openings formed in the bell crank 37 between the opposite ends thereof and in the flattened portion 33 of the support tube. As previously mentioned, the flexible cable 11 is suitably fixed to one end of the bell crank 37 which forms a portion of and is rigidly secured to the float arm 17. A buoyant float member 41 adapted to float on the surface of liquid in the tank, is secured to the outer end of the float arm 17.

In order to reduce undesirable vertical oscillations of the float arm due to splashing or sloshing of the fluid in the tank, damping means in the form of a coil compression spring 43 is mounted concentric with the pivot pin 39 and with the ends of the spring 43 in engagement with the flattened portion 33 of the support rod and with the bell crank 37. Preferably the spring 43 is in the form of a tapered coil and is of such a length that when it is positioned around the pivot pin 39 as shown in FIG. 4, the spring will be compressed to the degree necessary to frictionally resist and dampen undesirable oscillations of the float arm 17. Preferably, the lower end of the support tube 15 is bent as at 45 to provide an off-set so that the point of connection between the flexible cable 11 and the bell crank 37 is substantially in alignment with the open 35 and with the passage within the support tube 15 in order to prevent undue friction or binding during relative movement between the flexible cable 11 and the support tube 15.

One end of the flexible housing 13 is fixedly secured to the upper end of the support tube 15 as shown at 47 while the other end of the flexible housing 13 is fixedly secured in a threaded opening 49 formed in the base 9 of the casing 1.

As shown in FIG. 5, the flexible housing 13 is preferably formed of tightly coiled wire 51 in order to reduce to a minimum the points of frictional contact between the flexible cable 11 and the inner wall of the housing. The flexible housing 13 also preferably includes a thin outer covering 53 of plastic or other suitable material so as to prevent entry of foreign matter into the interior of the flexible housing.

Mounted within the casing 1 is a U-shaped support bracket 55 fixedly secured in place by threaded fasteners 57. The casing 1, which may be formed of cast aluminum or other suitable rigid material, including various metals and plastics, is provided with a circular bore 59 in which is fixedly mounted the indicator dial 3 having on its outer face calibrations to indicate the level of liquid in a tank. A circular crystal or glass 63 is secured in the bore 59 by means of a snap ring 65 seated in an annular groove 67 of the bore 59. The crystal 63 is maintained spaced from the indicator dial 3 by a ring or gasket 69 of neoprene or the like mounted in the bore 59 between the crystal and the indicator dial.

The movable indicator member 70 is formed of a single piece of wire material and includes a central portion 71 rotatedly mounted in aligned openings 73 formed in the legs of the U-shaped bracket 55 adjacent to the lower ends thereof. The pointer portion 5 of the movable indicator member 70 extends at right angles to the central portion 71 thereof and is positioned between the crystal 63 and the indicator dial 3 for cooperation with the dial. An opening 75 formed in the dial 3 is provided for the free passage of the central portion 71 of the movable indicator member.

At the other side of the U-shaped bracket 55, the movable indicator member 70 is provided with an actuating arm 77 which extends normal to the central portion 71 and is spaced a short distance outwardly from the U-shaped bracket 55. The flexible cable 11 is secured to a loop 79 formed at the outer end of the actuating arm 77.

In order to continually bias the pointer 5 toward the tank empty indicating position, a coil torsion spring 81 is positioned around the central portion 71 of the movable indicator member between the actuating arm 77 and the adjacent leg of bracket 55 with one end 83 of the spring 81 acting against the fixed U-shaped bracket 55 and with the other end 85 of the spring 81 acting against the actuating arm 77 biasing it and the pointer 5 in the tank empty indicating position.

The flexible housing 13 is adjustable in length so that the position of the pointer 5 may be manually adjusted and so that the liquid level gauge may be employed with tanks of different depth. In order to have the pointer 5 correspond with the position of the float member 41 and thus accurately indicate the level of a liquid within the tank, the length of the flexible housing 13 may be adjusted by a threaded connection including a threaded member 87 threaded into the connector 47. A threaded fitting 89 is fixedly secured to the lower end of the flexible housing 13 and is threaded into the member 87. The threaded connection between the member 87 and the fitting 89 is adjustable and the threaded portions may be of any length required for adjusting and setting the position of the pointer 5 so that it will correspond with the level of the fluid in the tank.

It is to be understood that when the pointer 5 is being manually adjusted or set, the float arm 17 and the end of the flexible cable or wire 11 in the tank 19 remain stationary. As the fitting 89 is threaded into the member 87, the effective length of the passageway confining the wire 11, including the support tube 15 and the flexible housing 18, is shortened while the length of the wire 11 remains fixed with the result that the wire 11 is forced out of the housing 13 and into the casing 1 and the pointer 5 is thereby adjusted toward the tank empty indicating position. By threading the fitting 89 outwardly the respect to the member 87, the passageway is lengthened, the wire 11 drawn from the casing 1 into the housing 13 and the pointer 5 adjusted toward the tank full indicating position.

The present liquid level gauge is particularly adapted for use with closed liquid tanks such as are used in boats, trucks, tractors and auxiliary tanks of various types which carry water, diesel oil, gasoline or other liquid. The pointer 5 moves across the face of the indicator dial 3 as the level of the liquid in the tank changes in order to indicate the level of the liquid in the tank.

One of the outstanding features of the present liquid level gauge is that the movement or sloshing of the liquid against the float mounted within the tank will not cause excessive movement of the pointer in relationship to the dial face. Prior known mechanical indicators move so rapidly across the dial of the gauge that it is extremely difficult to obtain an accurate reading of the level of liquid in the tank while a vehicle, boat or airplane carrying the tank is in motion. The damping effect of the spring 43 acting between the fixed support tube 15 and the pivoted float arm 17 substantially eliminates the difficulties mentioned above and provides an arrangement wherein movement of the pointer 5 due to vehicle movement and liquid slosh is extremely small.

It will be seen that the support and float portion of the liquid level gauge as disclosed herein may be quickly and easily mounted in any tank by cutting an opening of the proper diameter in the top of the tank, inserting the float device through the opening and then mounting and sealing the float device within the opening by means of the heavy rubber grommet.

I claim:

1. A liquid level gauge for a tank having an opening in the top wall thereof, comprising: a float; an elongated float arm carrying said float at one end thereof; a support tube; means pivotally mounting said float arm adjacent to and spaced from the other end thereof, on one end of the support tube; means for supporting and sealing the support tube in operable position in an opening in the top wall of a tank; said means for supporting and sealing the support tube comprising a resilient grommet having a central passage extending there through, said grommet having a first annular recess extending radially inwardly from the periphery thereof for engaging the tank wall and having a second annular recess extending radially outwardly from said central passage, and an annular rigid washer fixedly secured to said support tube intermediate the opposite ends thereof, said rigid washer being mounted in said second annular recess and said support tube extending through said central passage; indicator means including a casing and a movable member for indicating the level of liquid in the tank; a flexible cable housing connecting said indicator casing with the other end of said support tube; and a flexible cable extending through said cable housing and connected at one end thereof to said movable indicator member and connected at the other end thereof to the other end of said float arm.

2. A liquid level gauge according to claim 1 in which damping means comprising a coil compression spring is confined between the acts against said support tube and said float arm frictionally resisting and damping oscillating movement of said float arm due to sloshing of liquid in the tank.

3. A liquid level gauge according to claim 2 in which said coil compression spring is tapered and is mounted concentric with the pivoted connection of the float arm on the support tube.

4. A liquid level gauge according to claim 2 in which spring means is mounted in said casing in operable engagement with said movable member for biasing said movable member toward a position to indicate an empty tank.

5. A liquid level gauge according to claim 4 in which said movable member comprises an integral wire member having a central portion, a pointer at one side of said central portion and an actuating lever at the other side thereof, means in said casing mounting said central portion for rotation, and said spring means comprises a coil torsion spring having one end thereof in engagement with said actuating lever and having the other end thereof in engagement with said mounting means for said central portion.

6. A liquid level gauge according to claim 5 including means for adjusting the length of said cable housing to set the position of the movable indicator member to correspond with the position of the float in the tank.

References Cited
UNITED STATES PATENTS

| | | | |
|---|---|---|---|
| 1,497,771 | 6/1924 | Collison et al. | 73—318 |
| 1,607,645 | 11/1926 | Schulte | 73—318 |
| 1,607,736 | 11/1926 | Frank | 73—318 |
| 1,645,800 | 10/1927 | Cole et al. | 73—318 |
| 1,830,473 | 11/1931 | Lundgurst | 73—318 |
| 3,229,939 | 1/1966 | Hubbard. | |

LOUIS R. PRINCE, Primary Examiner

D. M. YASICH, Assistant Examiner